S. B. ROBISON.
BEET HARVESTER.
APPLICATION FILED JULY 10, 1918.

1,307,272.

Patented June 17, 1919.
2 SHEETS—SHEET 1.

WITNESSES

Inventor
Samuel B. Robison
By Richard Bellew
Attorney

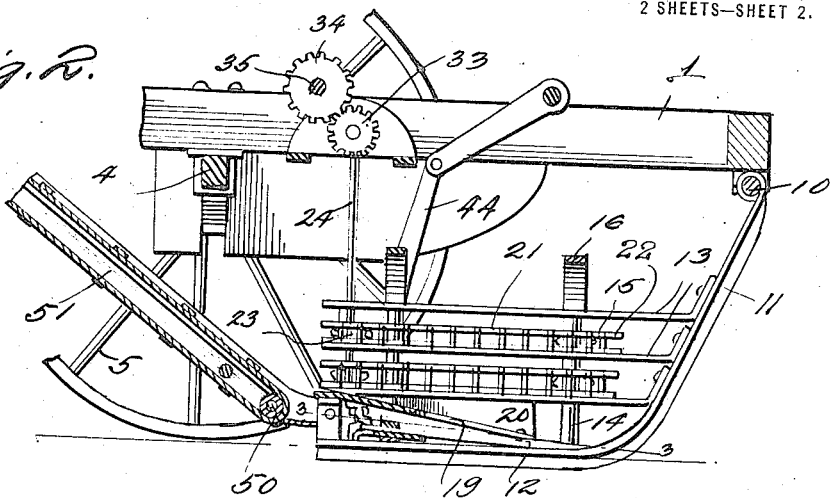
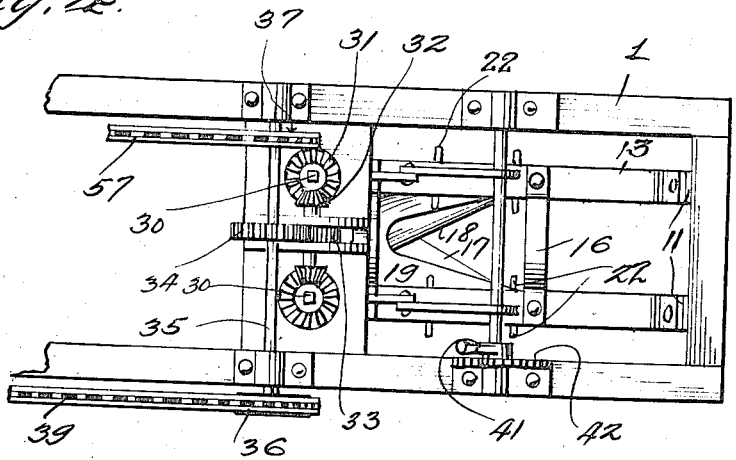
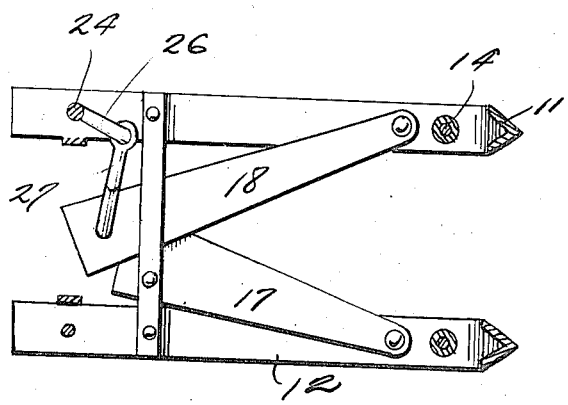

UNITED STATES PATENT OFFICE.

SAMUEL B. ROBISON, OF LAMAR, COLORADO.

BEET-HARVESTER.

1,307,272.　　　　　　Specification of Letters Patent.　　Patented June 17, 1919.

Application filed July 10, 1918. Serial No. 244,277.

*To all whom it may concern:*

Be it known that I, SAMUEL B. ROBISON, a citizen of the United States, residing at Lamar, in the county of Prowers and State of Colorado, have invented certain new and useful Improvements in Beet-Harvesters, of which the following is a specification.

This invention relates to harvesters, and more especially to stalk cutters; and the object of the invention is primarily to improve the mechanism for cutting the stalks and removing the tops of beets, and conveying them to a point where they may be dropped in piles at one side of the machine.

Other objects will be set forth in the following specification and claims. Referring to the accompanying drawings:

Fig. 2 is a central longitudinal vertical section through the stalk cutting mechanism, and Fig. 3 is a horizontal section through the frame on the line 3—3 of Fig. 2, Fig. 4 is a plan view of the mechanism at the front end of the machine.

Figure 1:
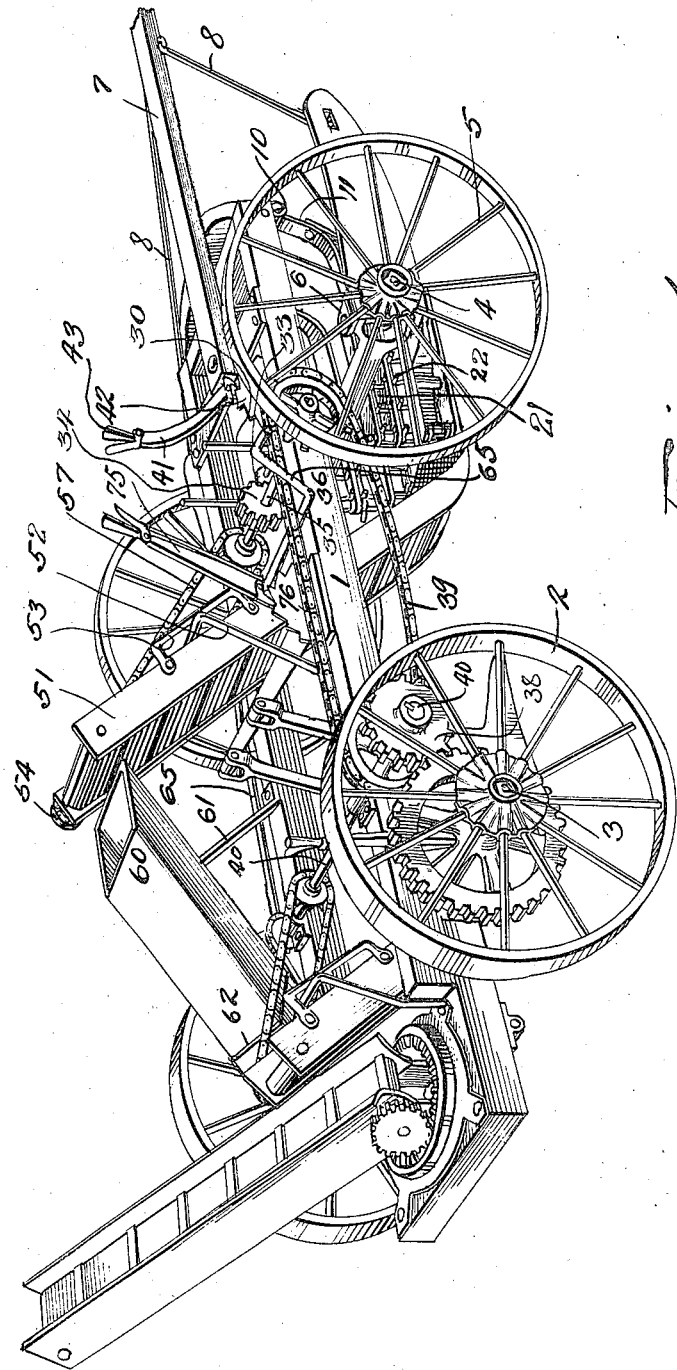
Figure 1 is a perspective view of this machine complete.

A framework 1 is sustained by rear wheels 2 and a rear or main axle 3, while a front axle 4 carries steering wheels 5 mounted on knuckles 6 and turned by the movement of the tongue 7 through links 8 connecting them therewith as will be clear from Fig. 1. The framework may carry an operator's seat, although such details are omitted for sake of clearness. I desire it to be understood that I am seeking to cover the mechanical construction and the possibilities of this machine whether it is employed for harvesting beets or anything else; or in other words, I do not wish to be limited to the uses of the machine, nor to its proportions of parts or materials. Broadly speaking, the framework carries at its forward portion stalk cutting mechanism whereby the tops of the beets are cut off, and just in rear of the same delivering mechanism whereby said tops are dropped at one side of the machine. The rear of the framework carries digging mechanism whereby the beets are dug from the row being treated, after their tops have been cut off and removed, and carrying or elevating mechanism is fastened thereto for delivering the beets at a desired point. Obviously, while I speak of beets, the vegetable so harvested and dug might be some other without departing from the spirit of the invention.

The stalk cutting mechanism is perhaps best seen in detail in Figs. 2, 3, and 4, and broadly speaking it comprises a pair of runners hingedly supported at their front ends beneath the main framework, knives therein, and driving mechanism for moving one knife. On a cross bar 10 under the framework 1 is hingedly mounted the front end of each runner 11, the same being sharp along its front and lower edges so that it will cut the ground if it be allowed to descend to a point where it enters the earth. Each runner is made up of a shoe 12 and a number of superposed parallel plates 13 through all of which pass upright tubular shafts 14 mounted on bolts, the shafts having sprockets 15 between the plates, and the upper ends of the bolts are connected by arches 16 which lead from one runner over to the other and are of sufficient height to permit the tops of the beets or other plants to pass beneath them. A cross strip fixedly connects the two runners at about their mid-length, and secured to this strip and to one of the runners is an oblique fixed knife 17. Pivoted to the other runner as shown is a movable knife 18 inclined rearwardly and inwardly to match the inclination of the oblique knife 17, which it overlies at its rear end, and over both knives is carried a scoop 19 whose forward edge is cut V-shaped to expose the cutting edges of the knives and whose side edges are turned upward between the shoes and the lowermost plate and converge slightly to the rear as indicated at 20. Disposed between the plates above the sides of the scoop are chain belts 21 having fingers 22, the belts passing around said sprockets 15 and leading rearward and passing around other sprocket wheels 23 fixedly mounted on upright shafts 24 which are journaled through the rear ends of the shoes as seen. Just above its lower end one of said shafts is cranked as at 26, and a link 27 connects it with the free end of the pivoted knife 18 for swinging the latter around its pivot.

The upper portions of said shafts are made angular as seen at 30 and are slidably mounted through the hubs of horizontally disposed gear wheels 31 mounted in bearings carried by and between the side bars of the main framework. A jack shaft is provided at its extremities with pinions 32 engaging said gear wheels, and between them is a small gear 33 engaged by a larger gear 34 on a countershaft 35 which is journaled in bearings on the main framework and has a sprocket wheel 36 on one extremity and by preference a sprocket wheel 37 near its other extremity for a purpose yet to be described. The rear or main axle 3 is connected by gears 38 with a driving shaft 40 journaled on the main framework as best seen in Fig. 1, and a sprocket wheel on this shaft is connected with the sprocket wheel 36 by a chain belt 39 as shown, whereby motion is communicated to the mechanism for driving the stalk cutters. Therefore as the machine progresses power is communicated to the upright shafts 24 and through the crank on one of them to the pivotel knife 18. The latter is caused to move across the fixed knife 17 to act against the stalks or the plants passing through the stalk cutting mechanism and over the scoop; and the result is that the stalks are cut off at the ground line or a little above or a little below the same, and the tops of the beets are passed rearward between the runners and over the scoop. The entire cutting mechanism may be adjusted vertically on its pivot on the shaft 10, by means of a rock shaft having a lever 41 moving alongside a toothed sector 42 and having a thumb latch 43 to engage the same, and a link 44 connecting an arm on the shaft with the stalk cutter. When the latter is raised the squared portions 30 of the shafts 24 slide through the gear wheels 31 without interrupting the rotation of said shafts or the action of the belts 21. Obviously, the cutting mechanism may be raised or lowered by reason of the fact that the front or steering wheels 5 rest upon the surface of the ground and hold the framework a given distance above the same at all times.

Hingedly connected at 50 to the rear end of the cutting mechanism is an elevator 51 leading obliquely upward and rearward through the frame 1 and having longitudinally slotted guides 53 on its side boards near its upper end, and an arched support 52 rising from the framework engages with the guides so that the entire elevator may be moved upward or downward as the rear end of the cutting mechanism is adjusted by mechanism already described. By preference the means for driving this elevator is at its upper end, and as the elevator will doubtless be an endless belt traveling over rollers at the extremities of its frame, a sprocket wheel 54 on the shaft of the upper roller is connected by a sprocket chain 57 with the sprocket wheel 37 on the counter shaft, and a belt tightener may be employed to keep said sprocket chain taut.

A chute 60 is carried by brackets 61 on the main frame, its upper end underlying the upper end of the elevator and its body inclining thence downward to one side and flaring downward so that material therein may not become clogged, and by means of this chute the tops raised by the elevator will be dropped to one side of the framework and preferably just inside one of the rear wheels 2. In order to permit the tops to be dropped in piles rather than rows, I provide a door 62 hinged to the lower end of the chute and standing normally closed, and lever mechanism 65 connected with the door puts its action within reach of the operator so that at times he may open the door and drop the accumulation of tops out of the chute 60 into a pile on the ground. Thus is provided a stalk cutter in which the tops are gathered by the cutting apparatus, elevated, delivered into a chute and dropped, from the latter at times in piles so that they may be picked up subsequently.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a beet topper, the combination with a main frame, a pair of runners hingedly mounted at their front ends under said frame, means for adjusting their rear ends vertically, and delivery mechanism connected with said rear ends; of rearwardly converging knives carried by the runners, mechanism for moving one knife, and means above the knives for carrying the tops rearward to said delivery mechanism.

2. In a beet topper, the combination with a main frame, a pair of runners hingedly mounted at their front ends under said frame, means for adjusting their rear ends vertically, and delivery mechanism connected with said rear ends; of rearwardly converging knives carried by the shoes of the runners, a scoop above said knives and leading to said delivery mechanism, the front edge of the scoop being notched to expose the cutting edges of the knives, and means above the knives for carrying the tops rearward to said delivery mechanism.

3. In a topper of the class described, the combination with a framework mounted on wheels, a cross bar beneath the framework, spaced gears mounted in a horizontal plane in rear of said cross bar and having squared holes through their centers, and means for rotating said gears simultaneously in opposite directions; of a pair of runners hingedly mounted at their front ends on said cross bar, knives carried by their shoes, in each runner a chain belt having fingers on its links and a pair of sprockets over which the belt moves, upright shafts through the rear sprockets and squared at their upper portions and extending slidably through said gears, and means for raising and lowering the rear ends of the runners.

4. In a topper of the class described, the combination with a frame work mounted on wheels, a pair of runners hingedly mounted at their front ends under said frame work, and means for adjusting their rear ends vertically; of knives connected at their front ends with said runners and converging toward their rear ends, one of said knives being fixed at its rear end, and mechanism for moving the rear end of the other knife transversely, as described.

5. In a topper of the class described, the combination with a frame work mounted on wheels, a pair of runners hingedly mounted at their front ends under said frame work, and means for adjusting their rear ends vertically; of knives connected at their front ends with said runners and converging toward their rear ends, one of said knives being fixed at its rear end, an upright shaft journaled in one of said runners and squared at its upper portion, a driving gear whose hub has a square opening for said portion of said shaft, a crank on the latter, and a link connecting the crank with the rear end of the movable knife.

In testimony whereof I affix my signature in presence of two witnesses.

SAMUEL B. ROBISON.

Witnesses:
J. J. CRISSMAN,
H. C. PIERSON.